(No Model.) T. W. BARTHOLOMEW. 4 Sheets—Sheet 1.
REVOLVING AIR TOY.
No. 279,630. Patented June 19, 1883.
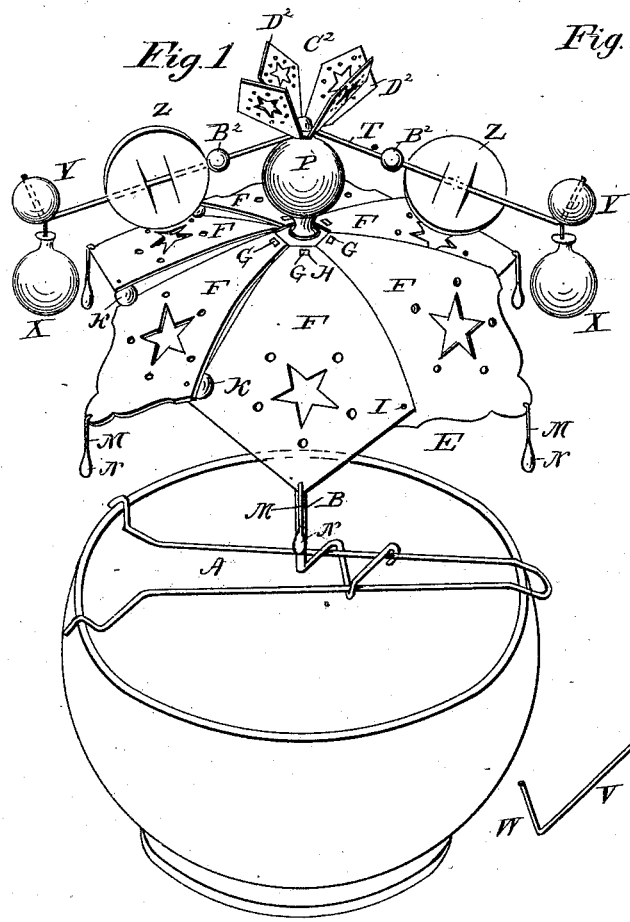
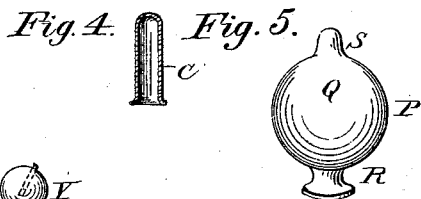
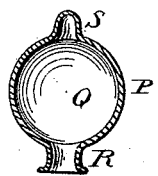
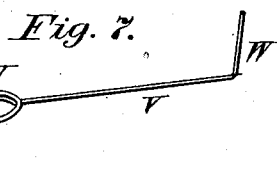
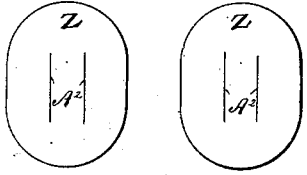
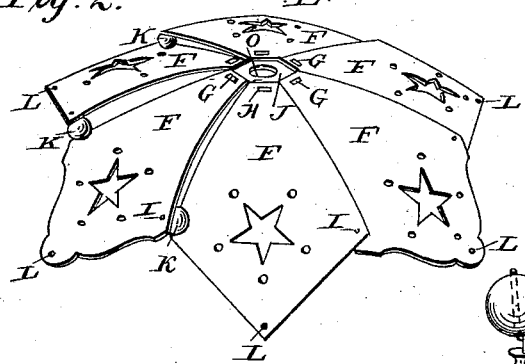
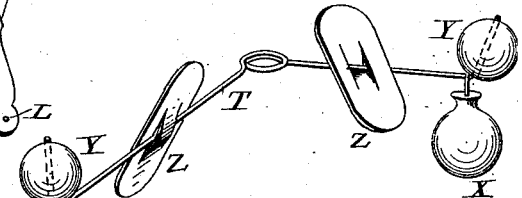
WITNESSES
F. L. Durand
J. Reed Littell
Thomas W. Bartholomew,
INVENTOR
by C. A. Snow & Co.
Attorneys.

(No Model.) 4 Sheets—Sheet 2.
T. W. BARTHOLOMEW.
REVOLVING AIR TOY.
No. 279,630. Patented June 19, 1883.
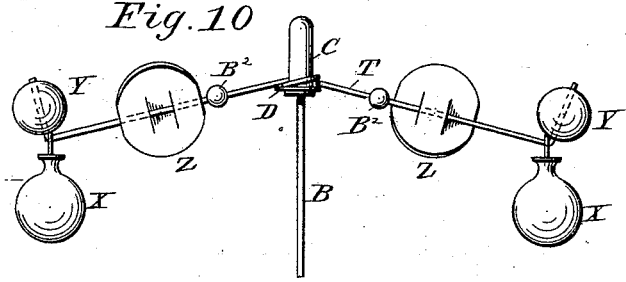
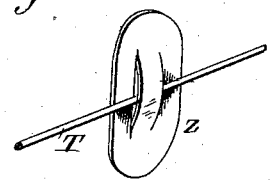
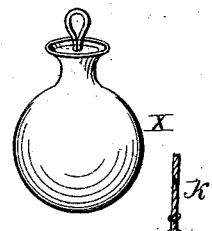
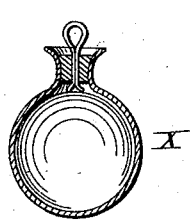
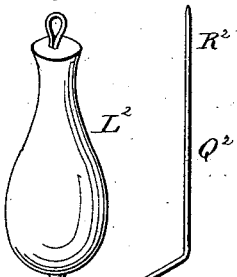
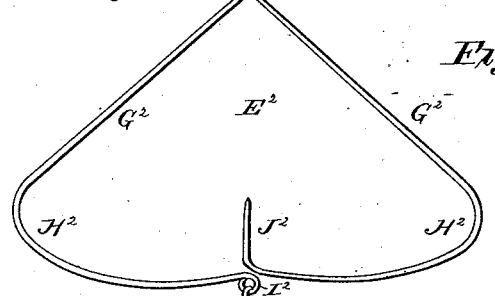
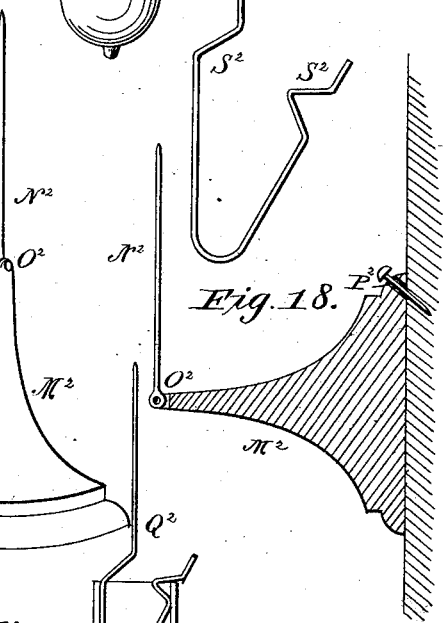
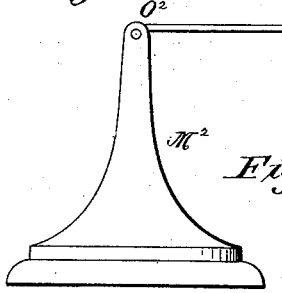
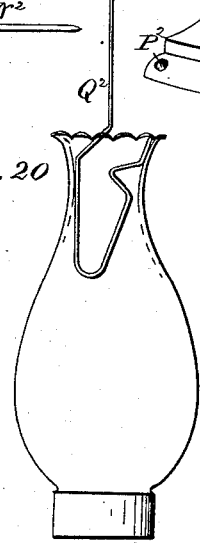
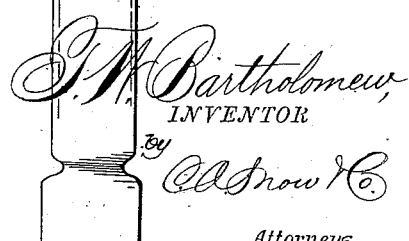
WITNESSES
F. L. Orrand
J. R. Littell
T. W. Bartholomew,
INVENTOR
by C. A. Snow & Co.
Attorneys.

(No Model.) T. W. BARTHOLOMEW. 4 Sheets—Sheet 3.
REVOLVING AIR TOY.
No. 279,630. Patented June 19, 1883.

WITNESSES
F. L. Ourand.
J. R. Littell

INVENTOR
T. W. Bartholomew,
by A. Snow & Co.
Attorneys.

N. PETERS. Photo-Lithographer, Washington, D. C.

(No Model.) T. W. BARTHOLOMEW. 4 Sheets—Sheet 4.
REVOLVING AIR TOY.
No. 279,630. Patented June 19, 1883.
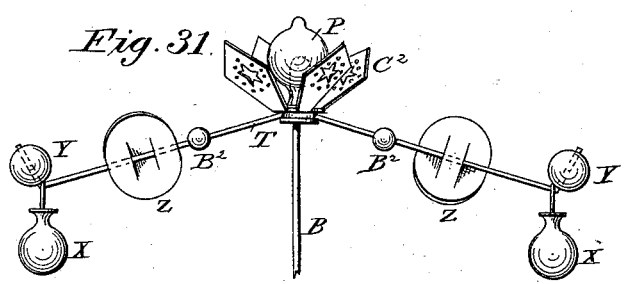
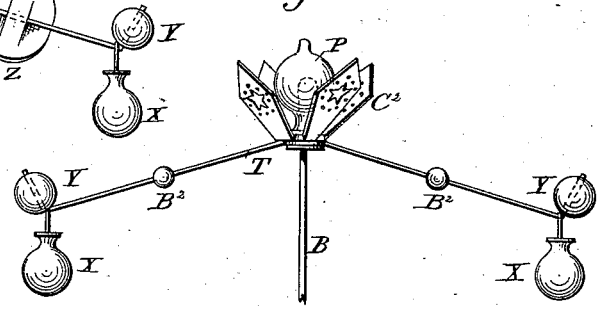
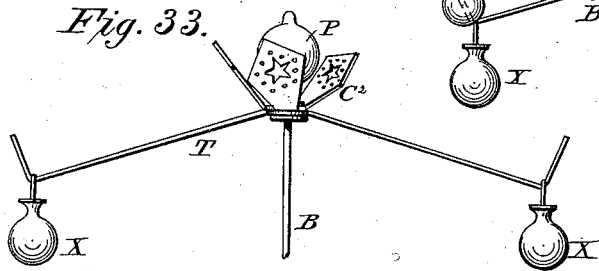
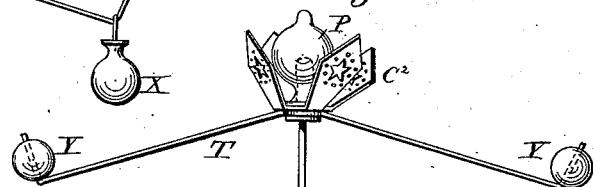
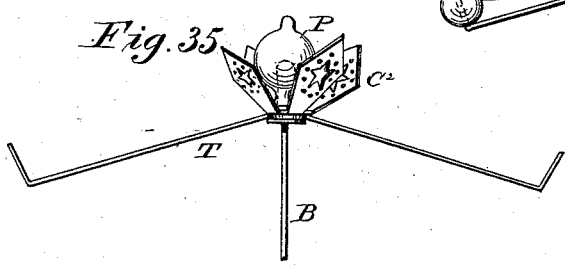
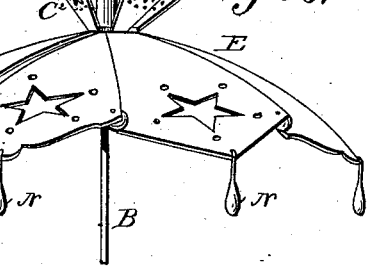
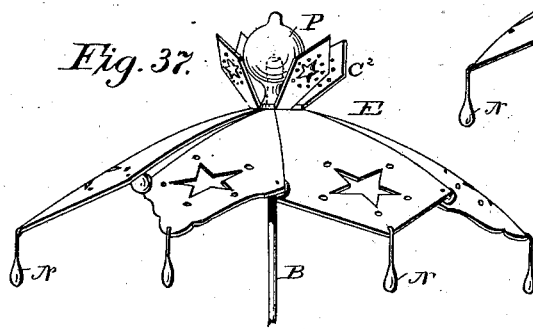
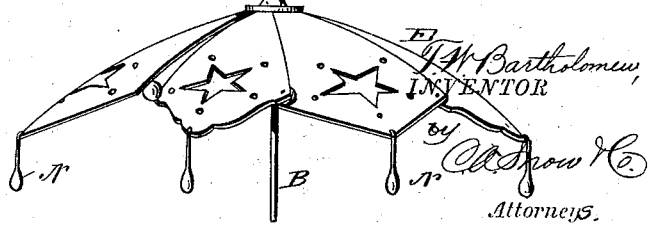
WITNESSES
F. L. Ourand.
J. R. Littell
T. W. Bartholomew,
INVENTOR
by A. Snow & Co.
Attorneys.

UNITED STATES PATENT OFFICE.

THOMAS W. BARTHOLOMEW, OF DANVILLE, PENNSYLVANIA.

REVOLVING AIR TOY.

SPECIFICATION forming part of Letters Patent No. 279,630, dated June 19, 1883.

Application filed March 31, 1883. (No model.)

*To all whom it may concern:*

Be it known that I, THOMAS W. BARTHOLOMEW, a citizen of the United States, residing at Danville, in the county of Montour and State of Pennsylvania, have invented a new and useful Revolving Air Toy, of which the following is a specification, reference being had to the accompanying drawings.

This invention relates to revolving air toys;
and it consists in certain improvements on the patent granted to myself on the 27th day of February, 1883, No. 272,846, as will be hereinafter fully described, and particularly pointed out in the claims.

Figure 22:
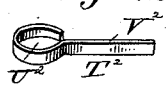
Figure 23:
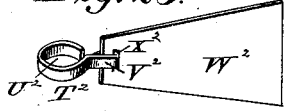
Figure 24:
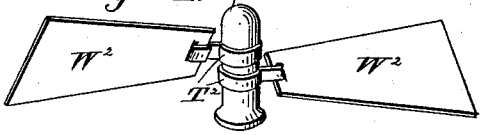
Figure 25:
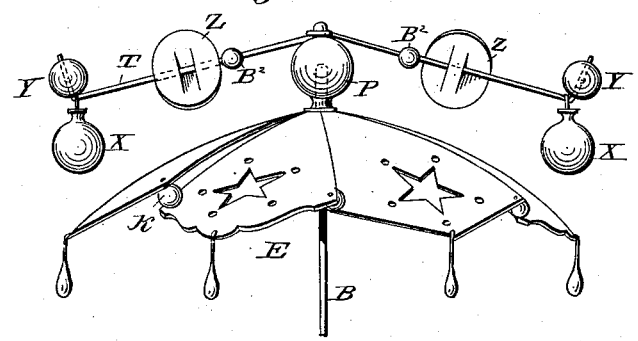

In the drawings hereto annexed, Figure 1 is a perspective view of my improved revolving air toy complete. Fig. 2 is a detail view, in perspective, of one of the revolving ornaments. Fig. 3 is a vertical transverse sectional view of the same. Fig. 4 is a detail sectional view of one of the bearing caps or thimbles. Fig. 5 is a perspective view of one of the ornamental caps. Fig. 6 is a sectional view of the same. Fig. 7 is a perspective view of the detachable ornament-supporting wire. Fig. 8 is a view showing the adjustable wings of the same. Fig. 9 is a view showing said wire equipped with wings, ornaments, and pendants. Fig. 10 is a view showing the said wire in position upon its bearing cap or thimble and equipped with wings, ornaments, pendants, and balance-weights. Fig. 11 is a detail view, showing the method of attaching the wings to the rod. Fig. 12 is a detail view, in perspective, of one of the pendants. Fig. 13 is a vertical sectional view of the same. Fig. 14 is a perspective view of a wire frame used for suspending the revolving toy. Fig. 15 is a view of the weight used in connection with the said frame. Fig. 16 is a perspective view of one form of a standard or support for the revolving toy. Figs. 17 and 18 are views illustrating different positions of the said standard or support. Fig. 19 is a perspective view of a different form of a standard or support adapted to be used in connection with ordinary lamp-chimneys. Figs. 20 and 21 are views illustrating the operation of the said standard or support. Figs. 22, 23, and 24 are views illustrating certain modifications in the construction of the revolving ornament; and Figs. 25 to 38, inclusive, are views illustrating various modifications of which my invention is capable.

The same letters refer to the same parts in all the figures.

My invention, in its present form, comprises, mainly, a vertical pointed supporting-wire, a cap or thimble journaled upon the same, and windmill-like revolving ornaments mounted upon the said cap, the construction and arrangement of the parts relatively to each other being as I shall now proceed more fully to describe.

A designates a base adapted to be mounted upon a gas-globe, and to hold in position a vertical wire, B, which is pointed at its upper end. These parts are shown in my former patent, and are not herein claimed. Journaled upon the upper pointed end of the rod B is a cap or thimble, C, made of glass or metal, and having its mouth surrounded by a flange, D.

E designates the revolving ornament, which is constructed of a series of wings, F F, which are sector-shaped, as shown, so that together they will form a complete circle. J is a suitable polygonal frame, the sides of which have outwardly-projecting tongues G. These tongues are passed through slots H in the inner ends of the wings F, and bent or doubled on the upper sides of said wings, which are thereby firmly secured to the said frame. By this method of attachment, instead of bending the tongues on the under sides of the wings, the outer ends of the latter are inclined to bend downwardly, thus forming an umbrella-shaped ornament. The wings may be made of mica or metal, and they may be perforated or otherwise embellished. If the device is not intended to be used directly over a flame, cardboard may be substituted for the materials named in the manufacture of the wings.

The outer corners of the wings F F are connected in any suitable manner—for instance, by short vertical connecting-rods I, of wire or other material, upon which beads or balls K, of colored glass or the like, are placed. These beads not only serve as ornaments, but they also space the adjoining corners of each pair of wings, and tilt the latter to an angular position in relation to the axis. A wind-wheel is thus formed, which, when properly balanced and journaled upon a vertical axis, will be readily revolved by the ascending current of warm air in the room in which it may be placed. The outer edges of the wings F have perforations L to receive hooked wire rods M, the lower ends of which are weighted by balls or beads N, forming ornamental pendants. The latter, as well as the beads K, serve the additional purpose of weighting the wheel, thereby balancing and holding it steady in a horizontal position when adjusted for operation.

The center of the plate J, which forms the center or hub of the wheel, has a perforation, O, by which it may be adjusted over the cap or thimble G, so as to rest upon the flange D of the latter.

P is a hollow ornamental cap, consisting of an approximately-spherical body, Q, having a neck, R, adapted to fit over the cap C, and provided with a pointed apex, S. The latter is for the purpose of holding the revolving supporting-wire T, (shown in Fig. 7,) and which consists of a wire, centrally upon which is formed a loop, U, fitting over the points, and from which arms V V extend outwardly and downwardly, as shown. The outer ends of the arms V have upturned fingers W, upon which ornamental pendants X are hooked. The fingers W also support ornamental perforated glass balls or beads Y. The latter, as well as the pendants X, may be readily removed and adjusted as occasion shall require.

Z Z are wings, made of mica or other suitable material, which may be made in any suitable ornamental shape—for instance, in the shape of birds. Each of the said wings is provided with a pair of parallel slots, $A^2$, to receive the arms V of the wire T, upon which the said wings are thus secured. These wings may be set horizontally or vertically for merely ornamental purposes; or they may be set at any desired angle, when they will assist the toy in revolving. By moving the wings in or out upon the arms they will also assist in balancing the toy.

$B^2$ $B^2$ are beads adjusted to slide upon the arms V, and serving for balancing, as well as for ornamental purposes.

Instead of placing the wire T on the cap P, it may be placed directly on the thimble C, resting on the flange D of the latter. It may be used independently of the revolving ornament E, in which case the wings Z will furnish the motive power. It may also be used in connection with a revolving ornament, $C^2$, having wings $D^2$, formed of a single piece of sheet metal, said wings being bent up at an angle to the center of the frame. This form is shown in the patent to which reference has been made above, and it is not herein claimed.

$E^2$ is a frame formed of wire by bending the same so as to form an angle, $F^2$, from which arms $G^2$ extend downwardly and outwardly, as shown. The said arms are bent back, as at $H^2$, until they nearly meet, one being provided with a loop or eye, $I^2$, and the other with an upwardly-projecting pointed arm or rod, $J^2$. This frame may be suspended by a cord, $K^2$, tied at the angle $F^2$, and the cap or thimble supporting the revolving ornament may be journaled upon the rod $J^2$. A weighted pendant, $L^2$, is suspended from the loop $I^2$, and serves to hold the frame steady and in a vertical position.

Another form of supporting device is shown in Figs. 16, 17, and 18 of the drawings. This consists of a base, $M^2$, to which a pointed rod, $N^2$, is connected by a hinge-joint, $O^2$, in such a manner that the said rod may be adjusted to a vertical or horizontal position, as required. Upon the rod $N^2$ the bearing cap or thimble may be directly journaled; or, when the rod is in a horizontal position, as in Fig. 17, the frame $E^2$ may be suspended from its end. The base $M^2$ is provided with a perforation, $P^2$, by which it may be hung upon a nail upon the wall, as in Fig. 18, thus forming a bracket upon which the revolving toy may be suspended. Still another form of a supporting device is shown in Figs. 19, 20, and 21. This is a simple bent rod of wire, $Q^2$, having legs of unequal length, the longest being pointed at $R^2$. The legs are provided with angular loops $S^2$. This device may be pushed into an ordinary lamp-chimney, where it will be held by the friction caused by the elasticity of the legs, and also by the loops $S^2$ catching over the rim of the chimney. The revolving toy will be journaled upon the pointed rod.

A modified form of the revolving wheel is shown in Figs. 22, 23, and 24 of the drawings. $T^2$ $T^2$ are strips of spring metal, bent so as to form loops $U^2$, having outwardly-projecting arms $V^2$. $W^2$ $W^2$ are wings of mica or other material, having slots $X^2$, through which the ends of the arms $V^2$ are passed, after which the ends of said arms are bent or doubled, thus securing the wings in position. The loops $U^2$ are adjusted directly upon the cap or thimble C, to which any desired number of the wings $W^2$ may in this manner be attached, thereby forming an independent wind-wheel. These wings may be used independently, or in connection with the other devices herein described.

In Fig. 1 of the drawings I have shown my improved revolving air toy complete and in position for operation. It here comprises the base A, wire B, cap C, revolving ornament E, cap P, wire T, with its attachments, and the ornament $C^2$, which is placed in an inverted position upon the apex S of cap P, over the wire T. Two or more of the wires T, with attachments, might be used by placing them across each other.

It will be understood that the supporting devices shown in Figs. 14, 16, 17, 18, 19, 20, and 21 are merely substitutes for the base A and wire B, to be used when it is desired to arrange the toy in other positions than over a gas-globe.

Figure 26:
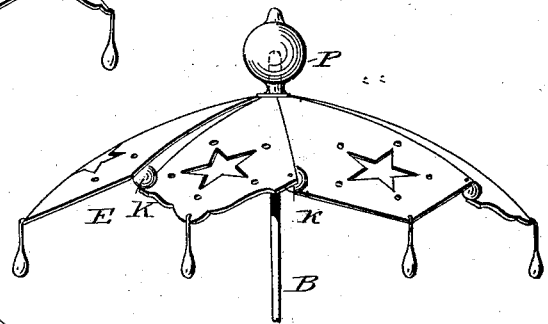
Figure 27:
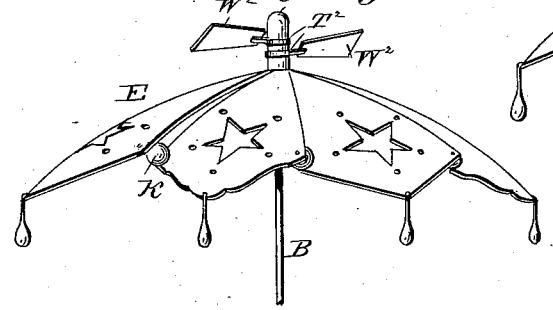
Figure 28:
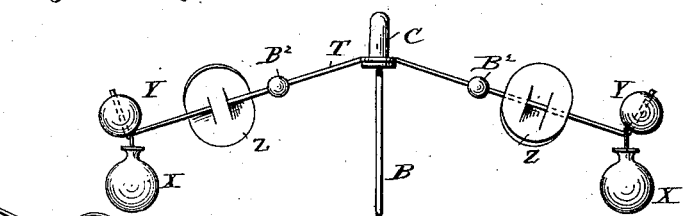
Figure 29:
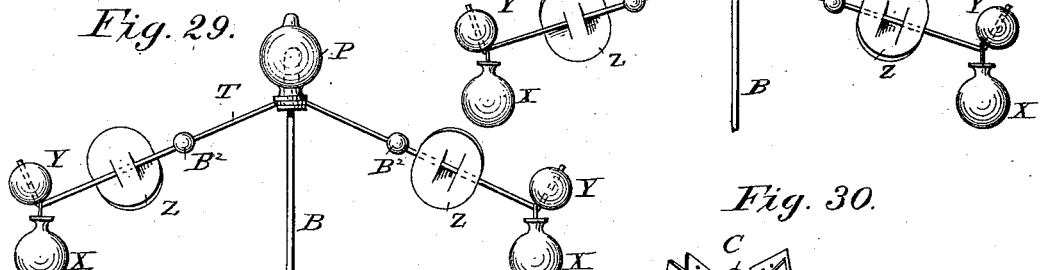
Figure 30:
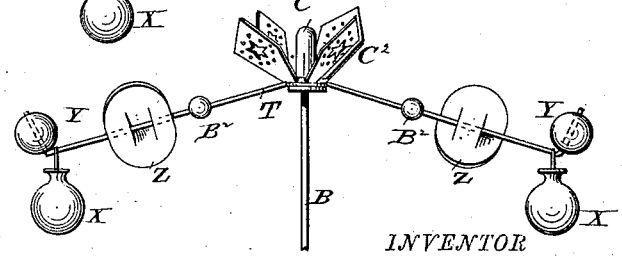

Figs. 25 to 38, inclusive, illustrate how, by slight changes, the toy may be arranged in numerous different attractive shapes. Thus in Fig. 25 the ornament C² has been detached. In Fig. 26 the wire T, with its attachments, has also been removed. In Fig. 27 the cap P has been detached and the wings W² substituted. In Fig. 28 the ornament E has been removed, and the wire T, with its attachments, placed directly upon the thimble C, which is also equipped with the wings W². In Fig. 29 the cap P has been substituted for the wings W², and the toy is driven by the wings Z upon the wire T. In Fig. 30 the ornament C² is again substituted for the cap P. In Fig. 31 the cap P is placed upon thimble C, above the ornament C². In Fig. 32 the wings Z have been removed from wire T, and the toy is now driven by the ornamental wheel C² alone. In Fig. 33 the beads B² and Y have been removed from wire T. In Fig. 34 the beads Y have been replaced and the pendants X removed. In Fig. 35 the beads Y have been again removed. In Fig. 36 the wheels E and C² alone are placed upon the thimble C. In Fig. 37 the cap P has been added, and in Fig. 38 the relative positions of the cap P and ornament C² have been interchanged.

When this device in any of its forms is used over a gas or lamp jet or flame it forms a very effective smoke and heat diffuser. Under all circumstances it forms a neat and attractive ornament, from which great amusement may be derived by changing it into the many forms of which it is capable.

I claim as my invention and desire to secure by Letters Patent of the United States—

1. In a revolving air toy, an ornamental revolving wheel consisting of a series of sector-shaped wings secured to a central polygonal frame or plate, forming an umbrella-like wheel, substantially as set forth.

2. The combination, with the sector-shaped wings having slots at their inner ends, of a central polygonal frame or plate having tongues extending from its sides through the slots in the wings, and bent or doubled on the upper sides of the latter, whereby the said wings are inclined to curve downwardly while still resting upon the sides or edges of the polygonal plate, as set forth.

3. The combination, with the sector-shaped wings composing the revolving wheel or ornament, of balls or beads interposed between the adjoining corners of said wings, whereby said wings are turned at an angle to the axis, substantially as set forth.

4. The combination, with the wind-wheel, consisting of sector-shaped wings united by a central polygonal plate, of weighted pendants attached to the outer edges of the said wings, substantially as set forth.

5. In a revolving air toy, the herein-described horizontal wind-wheel, consisting of a polygonal center plate having outwardly-projecting tongues, sector-shaped wings secured to the said center plate by means of said tongues, spacing-beads interposed between the adjoining outer corners of the said wings, and weighted pendants attached to the outer edges of said wings, all combined and operating substantially as and for the purpose set forth.

6. In a revolving air toy, the herein-described ornamental cap, having an approximately-spherical body, a flanged neck, and a pointed apex, substantially as and for the purpose set forth.

7. In a revolving air toy, the herein-described supporting-wire, having a central loop or eye, and arms projecting downwardly and outwardly from the same, and provided at their outer ends with upturned fingers, substantially as and for the purpose shown and specified.

8. The combination of the flanged bearing cap or thimble, the ornamental cap mounted upon the same and having a pointed apex, and the ornament-supporting wire having a central loop or eye by which it is adapted to be mounted on the pointed apex of the ornamental cap, substantially as set forth.

9. In a revolving air toy, the combination, with a supporting-wire having a central horizontal loop and outwardly-extending arms, of the wings connected adjustably to the said arms by means of slots through which the said arms extend, thereby enabling the said wings to be adjusted upon the wire arms at any desired angle and at any desired distance from the center, substantially as and for the purpose shown and specified.

10. The combination, with the ornament-supporting wire, constructed substantially as described, of the weighted beads or balls arranged to slide upon the arms of said wire, whereby the same may be properly balanced, substantially as set forth.

11. The combination, with the ornament-supporting wire, having arms provided with upturned fingers at their outer ends, of perforated beads or balls mounted upon the said fingers, and ornamental pendants suspended from the same, substantially as set forth.

12. The combination of the pointed pivot-wire, the flanged thimble, the horizontal revolving wheel, constructed as described, the hollow ornamental cap having a pointed apex, the ornament-supporting wire having a central horizontal eye and outwardly-projecting arms provided with upturned fingers, the adjustable wings, the sliding weights, and the ornamental balls and pendants, all arranged and operating substantially as set forth.

13. The combination, with the herein-described revolving air-toy, of the suspending-frame formed of a single piece of wire, bent so as to form an angle, arms extending downwardly and outwardly from the same, and inward extensions of the said arms, provided, respectively, with an upwardly-extending vertical pointed wire, and with a loop or eye, substantially as and for the purpose set forth.

14. The combination, with the herein-described suspension-frame, having a loop located directly under the vertical pivot-rod, as described, of a weighted pendant suspended from the said loop from for the purpose of holding the said frame steady and in a vertical position, as set forth.

15. The combination, with the flanged bearing cap or thimble, of the adjustable and detachable wings mounted upon strips of metal that are coiled so as to form eyes adapted to be adjusted upon the said cap, substantially as shown and specified.

16. The herein-described revolving air toy, the same consisting, essentially, of a suitable supporting-frame, a pointed pivot-wire, a flanged bearing cap or thimble, a wind-wheel, constructed substantially as described, resting upon the said cap, a hollow ornamental cap having a pointed apex, an ornament-supporting wire having a central horizontal eye, outwardly-projecting arms, and upturned fingers, adjustable wings, and sliding weights, and detachable and interchangeable ornaments, all combined and operating substantially as and for the purpose set forth.

In testimony that I claim the foregoing as my own I have hereto affixed my signature in presence of two witnesses.

THOMAS W. BARTHOLOMEW.

Witnesses:
  ROBERT ADAMS,
  WM. P. KINN.